(12) United States Patent
Buda et al.

(10) Patent No.: US 8,913,571 B2
(45) Date of Patent: Dec. 16, 2014

(54) CELL SEARCH METHOD FOR A DOWNLINK CHANNEL OF AN OFDMA TRANSMISSION SYSTEM

(75) Inventors: Fabien Buda, Paris (FR); Josephine Hus, Paris (FR)

(73) Assignee: Sequans Communications, Colombes (FR)

( * ) Notice: Subject to any disclaimer, the term of this patent is extended or adjusted under 35 U.S.C. 154(b) by 143 days.

(21) Appl. No.: 13/297,930

(22) Filed: Nov. 16, 2011

(65) Prior Publication Data

US 2012/0134322 A1    May 31, 2012

(30) Foreign Application Priority Data

Nov. 22, 2010    (EP) .................................... 10192086

(51) Int. Cl.
*H04W 4/00*     (2009.01)
*H04J 11/00*    (2006.01)
*H04W 48/16*    (2009.01)
*H04L 27/26*    (2006.01)

(52) U.S. Cl.
CPC ......... *H04J 11/0069* (2013.01); *H04J 11/0083* (2013.01); *H04J 11/0086* (2013.01); *H04J 11/0093* (2013.01); *H04L 27/2601* (2013.01); *H04W 48/16* (2013.01)
USPC ........................................................ 370/329

(58) Field of Classification Search
CPC ........................... H04J 11/0083; H04J 11/0086
See application file for complete search history.

(56) References Cited

U.S. PATENT DOCUMENTS 6,526,039 B1 *   2/2003   Dahlman et al. ............... 370/350
6,826,244 B2 *  11/2004   Demir et al. ................... 375/362
(Continued)

OTHER PUBLICATIONS

Kun-Chien Hung and David W. Lin, "Joint Detection of Integral Carrier Frequency Offset and Preamble Index in OFDMA WiMax Downlink Synchronization", Department of Electronics Enginring and Center for Telecommunications Research, National Chiao Tung University, Hsinchu, Taiwan, 2007, 6 pages.

(Continued)

*Primary Examiner* — Gregory Sefcheck
(74) *Attorney, Agent, or Firm* — David D. Brush; Westman, Champlin & Koehler, P.A.

(57) ABSTRACT

A cell search method in a multiple carrier wireless network includes a step of trying to select, among a list of candidate couples [carrier frequency; bandwidth], at least one candidate associated with at least one cell of the multiple carrier wireless network. The cell search method includes: a step of obtaining and ordering an initial list of possible candidate couples [carrier frequency; bandwidth] according to the multiple carrier wireless network; a step of reducing the initial list, delivering a reduced list, the reduced list including only candidates compatible with a predetermined communication mode of the multiple carrier wireless network, through a differential cross correlation of the candidate couples [carrier frequency; bandwidth] of the initial list; a cell search step in which a cross-correlation is performed by testing all time/frequency hypothesis for at least one candidate of the reduced list of candidates, delivering synchronisation information.

9 Claims, 5 Drawing Sheets

(56) References Cited

U.S. PATENT DOCUMENTS

| | | | |
|---|---|---|---|
| 7,136,432 B2* | 11/2006 | Min et al. | 375/326 |
| 7,366,141 B2* | 4/2008 | Yuan et al. | 370/335 |
| 7,403,578 B2* | 7/2008 | Min et al. | 375/326 |
| 7,606,139 B2 | 10/2009 | Bick et al. | |
| 7,746,920 B2* | 6/2010 | Demir et al. | 375/150 |
| 7,912,011 B2* | 3/2011 | Tanno et al. | 370/331 |
| 8,090,057 B2* | 1/2012 | Min et al. | 375/326 |
| 8,107,443 B2* | 1/2012 | Chen et al. | 370/335 |
| 8,134,996 B2* | 3/2012 | Onggosanusi et al. | 370/350 |
| 8,218,681 B2* | 7/2012 | Seki | 375/299 |
| 8,311,009 B2* | 11/2012 | Popovic et al. | 370/330 |
| 8,340,014 B2* | 12/2012 | Han et al. | 370/319 |
| 8,428,595 B2* | 4/2013 | Kazmi | 455/436 |
| 8,488,528 B2* | 7/2013 | Nagata et al. | 370/328 |
| 8,498,638 B2* | 7/2013 | Farnsworth et al. | 455/434 |
| 2006/0062196 A1 | 3/2006 | Cai et al. | |
| 2009/0252109 A1* | 10/2009 | Kim et al. | 370/330 |
| 2011/0034168 A1* | 2/2011 | Lindoff et al. | 455/434 |
| 2011/0206032 A1* | 8/2011 | Uemura et al. | 370/350 |
| 2011/0310878 A1* | 12/2011 | Lindoff et al. | 370/343 |

OTHER PUBLICATIONS

Ernest Seagraves, Christopher Berry, and Feng Qian, "Robust Mobile WiMax Preamble Detection", Military communications Conference, San Diego, California, Nov. 16-19, 2008, 7 pages.

Hyoongsoo Lim and Dong Seung Kwon, "Initial Synchronization for WiBro", Electronics and Telecommunications Research Institute, Daejeon, Korea, 2005 Asia-Pacific Conference on Communications Oct. 3-5, 2005, 5 pages.

Paul Boone, Michel Barbeau, and Evangelos Kranakis, "Strategies for Fast Scanning and Handovers in WiMax/802.16", International Journal of Communication Networks and Distributed Systems vol. 1, Nov. 2008, 7 pages.

European Search Report dated Apr. 18, 2011 for corresponding European Application No. 10192086.6, filed Nov. 22, 2010.

ETRI: "Cell Search Scheme for EUTRA", 3GPP Draft; R1-060426, 3rd Generation Partnership Project (3GPP), Mobile Competence Centre; 650, Route Des Lucioles; F-06921 Sophia-Antipolis Cedex; France, vol. RAN WG1, No. Denver, USA; Feb. 8, 2006, XP050101367.

* cited by examiner

Figure 1

(PRIOR ART)

CELL SEARCH METHOD FOR A DOWNLINK CHANNEL OF AN OFDMA TRANSMISSION SYSTEM

CROSS-REFERENCE TO RELATED APPLICATIONS

None.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure is directed, in general, to communication systems and, more particularly, to a system and method for providing an accelerated method for an equipment to enter a multiple carrier wireless network.

In the present application, a multiple carrier wireless network relates to a network which is based on an orthogonal frequency-division multiplexing (OFDM) coding technique. Such a coding technique is widely used in many data transmission processes. Such a coding technique is also used in conjunction with communication standards, or modes, especially wireless transmission standards such as WiFi, WiMax, HiperLAN.

In the following description, it will be referred to a WiMax network which is such a multiple carrier wireless network.

In the context of WiMax network (as in other communication modes) entry for a mobile station (MS), there are two major issues from a physical (PHY) layer point of view.

The first issue relates to initial scanning of a WiMax signal, meaning a mobile station which is powered up for the first time and needs to connect to its rightful network (i.e. its rightful communication mode). The main concern in this phase is the connection time because searching through a long list of candidates (provisioned or not) may lead to less decent connection time intervals.

The second issue relates to the problem of a dropped mobile station, meaning a station that has suddenly lost connection to the network and enters idle state. The drop may be induced by a turn around the corner, entering an elevator and getting out at an opposite side, being a cell-edge user, etc. . . . . The general aim 1s to connect back to the network as soon as possible and to preserve battery life in the absence of a network in sight. This is possible by affording a high targeted idle/scan activity ratio (for instance 30/1), and simultaneously a low "scan+idle" time frame, by means of accelerating the scan time as much as possible. As it only scans for short intervals separated by larger idle intervals, the SS is prevented to consume too much power by searching continuously in vane in case there is no network. The importance of lowering power consumption is obviously crucial, especially when the mobile station is a handset.

BACKGROUND OF THE DISCLOSURE

There have been various approaches on how to perform WiMax network entry, a brief overview of which is presented hereafter.

Figure 1:
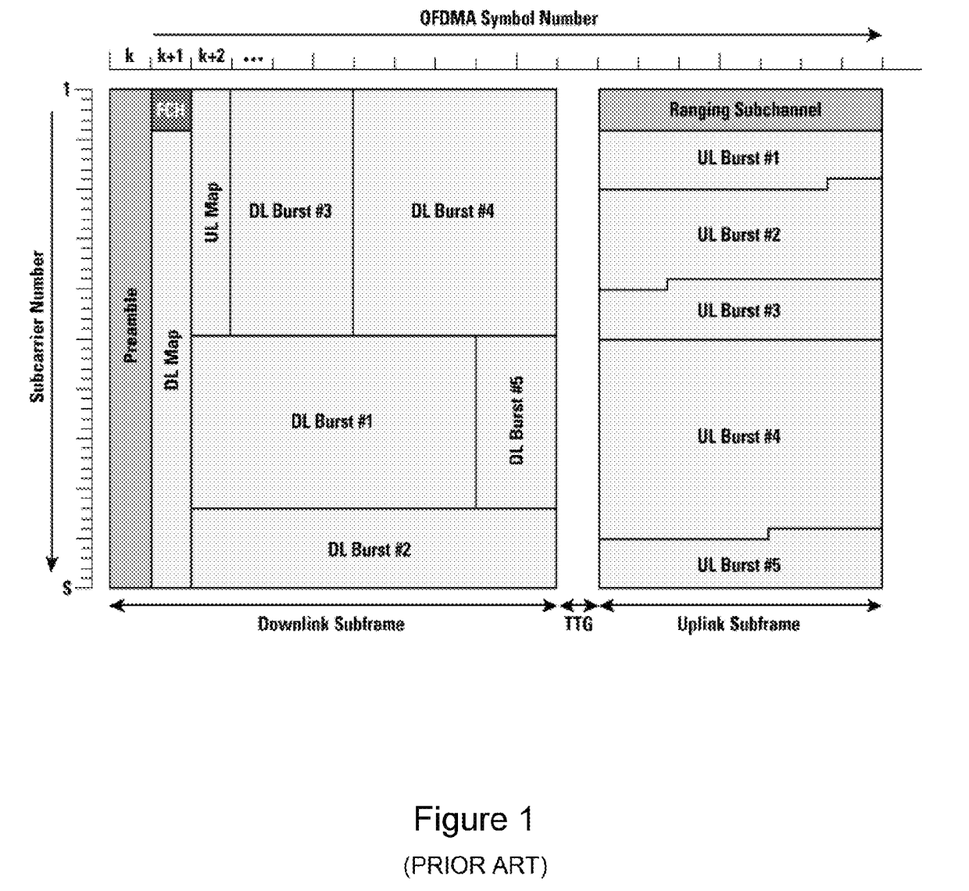
FIG. 1, already presented, illustrates the structure of a WiMax frame.

In WiMax TDD ("Time Division Duplex"), the frame structure comprises a preamble, followed by a downlink (DL) transmission period and an uplink (UL) transmission period with respective intervals of time inserted in between, to allow the mobile station to switch from receiver mode to transmitter mode and back. The frame duration in mobile WiMax of 10 MHz bandwidth is 5 ms (fixed). During this time interval, 48 OFDMA symbols are transmitted in the frame. The structure of the frame is presented in relation with FIG. 1.

The preamble of the frame comprises an OFDMA symbol which repeats itself every frame length (5 ms) and it serves as a means of synchronization of a mobile station (MS) to a base station (BS). The useful subcarriers of the OFDMA symbol which make up the preamble (ex: 852 useful subcarriers for an FFT size of N=1024 and spaced at a fixed distance of 10 kHz, no matter the value of N) are modulated one over three using a boosted BPSK modulation with a specific pseudo-noise (PN) code. Depending on the starting offset used to modulate the subcarriers one over three (0, 1 or 2 subcarriers), there are three defined segments. The standard states that there are 114 possible PN patterns for a WiMax preamble, i.e 38 per segment.

In order to enter the network, the mobile station must first scan among all the couples (central frequency/bandwidth) candidates, in search of one of the 114 preambles. In other words, in WiMax, as in other OFDM systems, the classical approach for mobile station (MS) synchronization comprises testing (scanning) all frequency/timing hypotheses over all couples of (central frequency/bandwidth) candidates, calculating a cross-correlation in the time domain for each such hypothesis, followed by peak(s) detection.

After a synchronization phase, the actual preamble detection is performed. The issue with these types of time domain algorithms is that although they offer very good accuracy, they are computationally expensive because of the exhaustive hypothesis testing.

A list of couple (central frequency/bandwidth) candidates can be, for example purpose: ((3.5 GHz, 10 MHz), (3.5 GHz, 5 MHz), (3.6 GHz, 10 MHz), (3.6 GHz, 5 MHz), . . . ).

The same approach of exhaustive scanning can be equally done in frequency domain.

An alternative to this technique would be to perform a blind autocorrelation in time domain (without any prior hypothesis testing). Because of the structure of the WIMAX preamble, which presents a factor three decimation in the frequency domain, a three peaks detection can be done in time domain which provides the synchronization information. This method works well when dealing with an AWGN channel, but dealing with a non line of sight channel would oblige long time averaging which involves a longer network entry phase.

Regarding the preamble detection, which is done post synchronization, a differential approach in frequency domain is also used to compensate the frequency selective fading, since the cell search is performed before channel estimation.

A conventional approach for accelerating network entry through PHY layer algorithms is to perform ordering of the candidates by means of power detection prior to synchronization. Although this filtering phase may be useful for reducing the list of possibilities, it does not guarantee that the detected power corresponds to a WIMAX signal (other communication modes may be in the frequency vicinity of a WiMAX signal). This can slow down network entry by attempting mobile station (MS) connections to false candidates (for example access points or base stations with other communication modes, such as a WiFi access point).

Acceleration of the network entry is however typically done in higher levels by using heuristics (for instance an ordering of candidates by most recently used, performed in the MAC level), but a procedure for doing this acceleration in the PHY layer does not exist.

SUMMARY

An exemplary embodiment of the invention does not comprise these drawbacks of the prior art techniques. Indeed, the invention relates to a cell search method in a multiple carrier wireless network, said method comprising a step for trying to select, among a list of candidate couples [carrier frequency; bandwidth], at least one candidate associated with at least one cell of said multiple carrier wireless network.

According to an embodiment of the invention, said cell search method comprises:
- a step for obtaining and/or ordering an initial list of possible candidate couples [carrier frequency; bandwidth] according to said multiple carrier wireless network;
- a step for reducing said initial list, delivering a reduced list, said reduced list comprising only candidates compatible with a predetermined communication mode of said multiple carrier wireless network, thru a differential cross correlation of said candidate couples [carrier frequency; bandwidth] of said initial list;
- a cell search step in which a cross-correlation is performed by testing all time/frequency hypothesis for at least one candidate of said reduced list of candidates, delivering a synchronisation information.

Thus, an embodiment of the invention highly accelerates the process of identifying possible candidates to which it may be possible to connect.

According to a specific embodiment, each element of said reduced list comprises, in addition to carrier frequency and bandwidth, a base station identifier and/or a frame preamble number.

Thus, an embodiment of the invention allows delivering additional information which can be used for accelerating the others processing steps, and more particularly the network entry steps.

According to a specific embodiment, said step for reducing said initial list comprise, for a current candidate of said initial list:
- an RF settings step for adjusting reception parameters of a signal;
- at least one step for detecting, for said current candidate, a presence of a preamble, representative of said communication mode, among a plurality of assumed symbol extracted from a received signal;
- a decision step wherein said current candidate is inserted in said reduced list when at least one presence of one preamble has been detected.

According to a specific embodiment, said step for detecting a presence of a preamble comprise a step for calculating one differential cross correlation C per symbol k of said plurality of assumed symbol and wherein said current candidate is inserted in said reduced list when at least one of said cross correlations C exceeds a predetermined threshold Th.

Thus, this differential cross correlation C allows cancelling out the phase ramp due to lack of prior synchronization.

According to a specific embodiment, said step for obtaining and ordering said initial list of possible candidate couples [carrier frequency; bandwidth] comprises a step for getting said initial list according to a communication standard.

According to a specific embodiment, said step for obtaining and ordering said initial list of possible candidate couples [carrier frequency; bandwidth] comprises an initial scan step in which said candidate couples are detected and ordered by means of power detection.

According to another aspect, an embodiment of the invention relates to an apparatus for searching cell in a multiple carrier wireless network, said apparatus comprising means for trying to select, among a list of candidate couples [carrier frequency; bandwidth], at least one candidate associated with at least one cell of said multiple carrier wireless network.

According to an embodiment of the invention, said cell search apparatus comprises:
- means for obtaining and/or ordering an initial list of possible candidate couples [carrier frequency; bandwidth] according to said multiple carrier wireless network;
- means for reducing said initial list, delivering a reduced list, said reduced list comprising only candidates compatible with a predetermined communication mode of said multiple carrier wireless network, thru a differential cross correlation of said candidate couples [carrier frequency; bandwidth] of said initial list;
- a cell search means in which a cross-correlation is performed by testing all time/frequency hypothesis for at least one candidate of said reduced list of candidates, delivering a synchronisation information.

An embodiment of the invention also relates to a mobile station which comprises a cell search apparatus as previously described.

In another aspect, an embodiment of the invention relates to a computer program product downloadable from a communications network and/or stored on a non-transitory computer-readable support and/or executable by a microprocessor. In the embodiment said computer program product comprises program code instructions for trying to select, among a list of candidate couples [carrier frequency; bandwidth], at least one candidate associated with at least one cell of said multiple carrier wireless network.

In this embodiment, the computer program also comprises program code instructions for:
- the obtaining and ordering an initial list of possible candidate couples [carrier frequency; bandwidth] according to said multiple carrier wireless network;
- the reducing said initial list, delivering a reduced list, said reduced list comprising only candidates compatible with a predetermined communication mode of said multiple carrier wireless network, thru a differential cross correlation of said candidate couples [carrier frequency; bandwidth] of said initial list;
- the cell searching in which a cross-correlation is performed by testing all time/frequency hypothesis for at least one candidate of said reduced list of candidates, delivering a synchronisation information.

BRIEF DESCRIPTION OF THE DRAWINGS

Other features and advantages shall appear more clearly from the following description of a preferred embodiment, given by way of a simple illustrative and non-restrictive example, and from the appended drawings: of which.

DETAILED DESCRIPTION OF ILLUSTRATIVE EMBODIMENTS

1. General Principles of an Embodiment of the Invention

As already told, the main principle of the an exemplary embodiment of the invention is to propose, before realizing the cell search in itself, a filtering step which, firstly deletes the unlikely candidates couples of values [carrier frequency; bandwidth] by verifying the belonging of the couple to a communication mode of said multiple carrier wireless network and secondly furnish, to the cell search step, additionally to said candidate [carrier frequency; bandwidth], a preamble number which is the base station identifier.

According to an embodiment of the invention, this filtering step is configured such that it does not consume a large amount of calculation resources but allows finding interesting information for the next step of the procedure.

The proposed algorithms presented hereafter are meant to highly accelerate the entry in the multiple carrier wireless networks, which is important because connection time in initial power up is a global quality indicator for either handset or customer premises equipment (CPE). On top of this, the proposed algorithm enables acceleration in the reconnection of a dropped handset or CPE.

The main steps of the procedure will be presented herein after in conjunction with FIG. 2A and FIG. 2B.

As previously mentioned, a common procedure for network entry consists, after having made the RF settings of the received signal, in first sorting the candidates by means of power detection (called "Initial Scan"), followed by a rigorous cross-correlation by testing all time/frequency hypotheses (called "Cell Search").

In the present disclosure, the trick of the proposed method is to introduce a new step (called "Fast Cell Search"), which accelerates the network entry procedure by filtering out unlikely candidates couples and directly feeding the preamble number to the cell search module (otherwise, all preambles are tested over all frequency/timing hypothesis which is highly time consuming). As explained below, the fast cell search realizes a differential cross correlation of the candidate couples [carrier frequency; bandwidth] of the list of candidates.

Figure 2A:
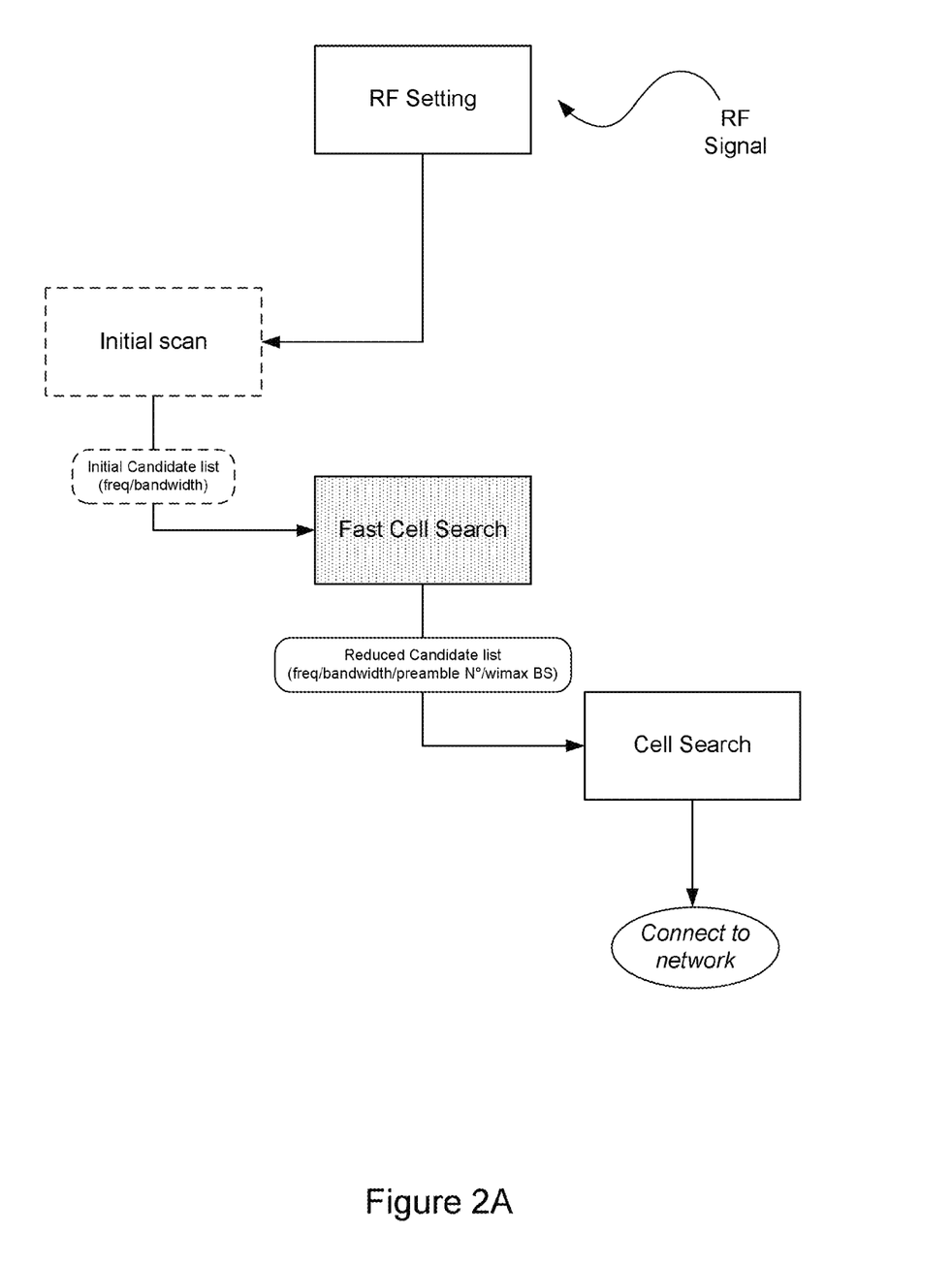
FIG. 2A illustrates the main steps of the method according to a first embodiment.

FIG. 2A illustrates a first embodiment of the method in which the Fast Cell Search step is inserted after the RF settings step and the initial step. The initial scan step provides an initial list of ordered candidates. This order is based on the power of the signal from the more powerful to the less powerful. The initial candidate list is then processed by the Fast Cell Search technique and the resulting reduced candidate list is given to the Cell Search process. The Cell Search is then performed (based on the reduced candidate list) providing synchronization information, and a connection to the multiple carrier wireless network is done in a classical way.

Having an initial candidate list, an incremental filtering of preambles is performed. Suppose a number of initial candidates (X possible preambles multiplied by each couple [carrier frequency; bandwidth] hypothesis of the Y initial candidate list). The main idea is to coarsely reducing this list by means of low complexity algorithms. As the list of candidates shortens, increase reliability by using more complex, time consuming algorithms which will only be tested over a short loop corresponding to the already filtered candidates.

Figure 2B:
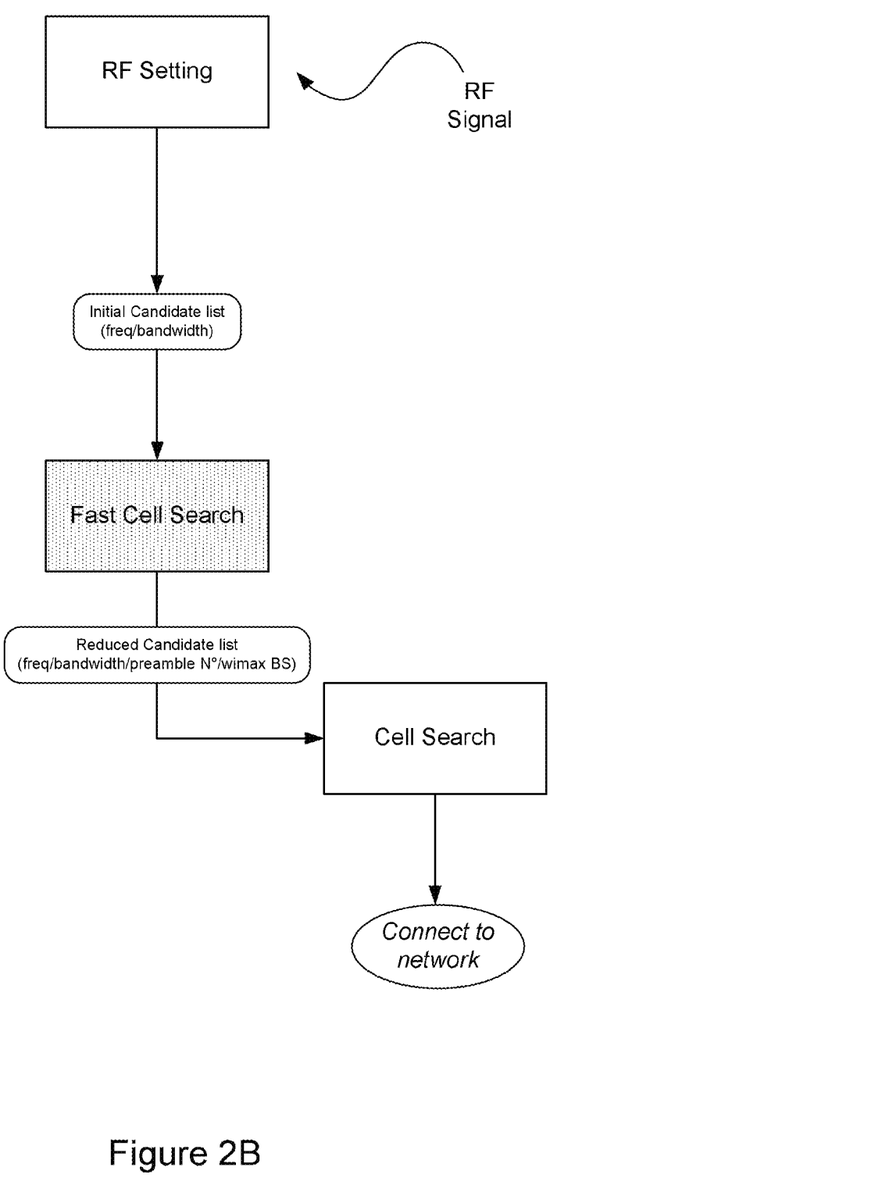
FIG. 2B illustrates the main steps of the method according to a second embodiment.

FIG. 2B illustrates a second embodiment of the method in which the Fast Cell Search step is processed directly after the RF settings. In this embodiment, the Initial Scan step is not realized and the Initial Candidate list [carrier frequency; bandwidth] is directly processed, without ordering, by the fast cell search technique. The other steps remain the same as in FIG. 2A.

Herein after, a specific embodiment is presented. However, an embodiment of the invention is not limited to this embodiment. For example, variation of the proposed techniques can also be used for providing, to the cell search step, a reduced list of candidates to which the time and resources consuming algorithm can applied.

2. Description of a Specific Embodiment

A specific embodiment is presented herein after. This embodiment can be applied to standards IEEE 802.16e and IEEE 802.16m. This embodiment focuses on duplexing mode TDD, although the embodiment could be extended to FDD as well.

In this specific embodiment, the three steps presented in relation with FIG. 2A are considered: "Initial Scan", "Fast Cell Search" and "Cell Search".

The "Initial Scan" is a classical power detection, sorting (ordering or reducing) the number of couple [carrier frequency; bandwidth] candidates by power means. It is a very low cost algorithm consisting of a simple autocorrelation and threshold comparison.

This "Initial Scan" step is done after having performed an RF setting which simply consists of setting the appropriate carrier frequency and bandwidth of the receiver and applying the maximum RF gain (in order to detect even the lowest signals; if there is saturation, it still means that there is a significant signal at the input so we don't care). The RF gain is supposed to translate the received RF signal into a base band signal of a certain desired dynamic range.

Not being synchronized, the maximum precision loss is of 3 dB, when only half of the OFDMA symbol power is detected. However, this filtering phase in the scanning procedure does not ensure that the detected power corresponds to a WiMax signal, it could quite as well be a WiFi interfering signal as the WiFi and WiMax bands are quite close.

It should be noted that, in this embodiment, any solution (time domain or frequency domain) can be used, as long as it sorts the candidates in the decreasing order of power.

Following this "Initial Scan" step, the couples [carrier frequency; bandwidth] candidates are filtered from an initial number Nb_f1 to a second number Nb_f2 where Nb_f2<=Nb_f1. The filtering only refers to [carrier frequency; bandwidth] candidates, as in this stage there is no knowledge of which preamble number is more likely to have occurred.

The "Fast Cell Search" step is the key accelerating step within the algorithm, and comprises, in this embodiment, a frequency domain cross-correlation with each of the 114 possible WiMax preambles. One of the features of this frequency domain cross-correlation is that it is performed differentially so as to cancel out the phase ramp due to lack of prior synchronization. This is a key aspect of an exemplary embodiment of the invention.

The preamble detection is done blindly and in addition to this, frequency selective fading due to the channel is also removed. Consequently, without any time consuming synchronization hypothesis, this "Fast Cell Search" step gives two outputs: detection/non-detection of a WiMax DL and the preamble number (when detected) which is fed to the subsequent, more complex cell search step.

Figure 3:
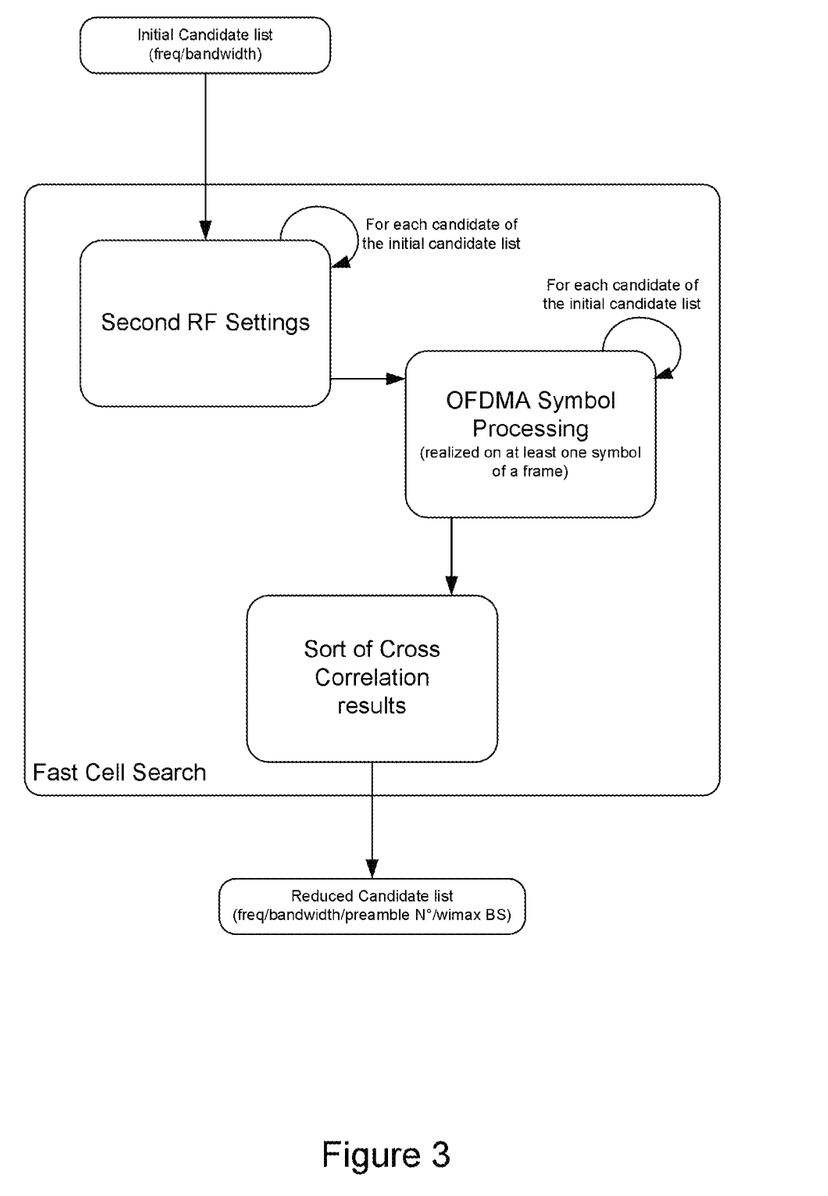
FIG. 3 is a bloc diagram of the Fast Cell Search step, FIG. 4 provides a schematic illustration of the hardware structure of an apparatus for the execution of the presented method.

The details of the fast cell search are addressed hereafter, in relation with FIG. 3.

After having sorted (trimmed down or ordered) the couples [carrier frequency; bandwidth] candidates of the initial list to a number of Nb_f2, for each one of these candidates of these list, new RF settings (more complex than the RF settings done before the "Initial Scan" step) are performed, in order to handle saturation. This step is performed for each candidate of the list.

The RF settings in this case consists in setting the appropriate carrier frequency and bandwidth for the receiver, and also applying the gain that is needed in order to ensure that the signal is within a target dynamic range in the base band (RF gain profiles). The RF settings are to ensure that the frequency of the respective candidate is respected within a tolerance interval of half of the subcarrier spacing (+/−5 kHz in the case of WiMax).

There are two RF gain profiles which are defined and they are meant to cover the entire range of possible WiMax signals (from very low to very high). A maximum RF gain is applied initially, assuming that the BS are emitting very low and that it is a priority to connect to the network, no matter the poor conditions. If saturation is detected (at least one sample of the analogue to digital converter surpasses the saturation threshold), then the lower RF gain setting is applied, and the fast cell search phase is repeated as though a for a different RF setting.

Once the RF settings are completed, an "OFDMA Symbol Processing" step is processed. In this step, each non-synchronized OFDMA symbol over a number of Z symbols, for instance, 49 (for the particular case of a WiMax network supporting a maximum frame length of 5 ms and a bandwidth of 10 MHz) is processed. A frame of 5 ms consists of 48 symbols, and gaps to turn from TX mode to RX mode and back, so testing 49 OFDMA symbols ensures that if there is a preamble, it is comprised in the search (again for a 10 MHz band).

In other words, for one duration of one frame, this step looks for a preamble among 49 OFDMA symbols, by testing the symbols and try to see whether it is possible to identify a symbol which corresponds to a WiMax preamble. For each symbol (among the 49 OFDMA symbol), a differential cross correlation C is calculated. The value of the cross correlation C is compared to a predetermined threshold Th, in order to decide whether the value is representative of a WiMax Preamble or not.

In this embodiment, the "OFDMA Symbol Processing" step is realized on all the 49 OFDMA symbol of the frame. Of course, this step can be performed over a different quantity of symbols. This depends on the maximum length of the frame for the respective network. This could also depend on other considerations, and for example of probabilities of finding a preamble in some symbols rather than in other symbols. These probabilities could be furnished by another processing step (not represented) which would be performed before the fast cell search.

The method for calculating the cross correlation C is given herein after.

The processing of each OFDMA symbol is done post FFT, after extracting the useful subcarriers.

The only synchronization hypothesis for this step is that at least half of subcarrier spacing (for instance +/−5 kHz) precision is ensured. Regarding the absence of time synchronization, there may be up to half of OFDMA symbol offset in the worst case.

After the FFT, assuming that the lack of time synchronization manifests through a cyclic delay of D samples and assume one tap channel (for simplification sake) of value g, the received signal is:

$$R_N(k) = FFT_N(k) g e^{\left(-j\frac{2\Pi}{N}Dk\right)} + N_N(k),$$

where:
- $R_N(k)$ is the complex received FFT symbol of length N, and of subcarrier k.
- g is the complex channel including the attenuation, ((g)), and phase, arg{g}.
- D is the number of delay samples in time domain which translates to a phase ramp, $$e^{\left(-j\frac{2\Pi}{N}Dk\right)},$$

in frequency domain, after the N-FFT
- $N_N(k)$ is the receiver noise
- $FFT_N(k)$ is the complex received FFT symbol of length N, and of subcarrier k, if the synchronization is perfect (D=0), there is no channel (g=1) and no noise ($N_N(k)$=0).

Selecting only the subcarriers for one of the 3 segments, s, we extract:

$$R_s(k) = R_N(3k+s), k \epsilon [0 \ldots L-1], (L=852/3=284 \text{ for } N=1024, 142 \text{ for } N=512, \text{ etc.} \ldots ).$$

If the respective OFDMA symbol segment corresponds to a sent preamble, then:

$$R_s(k) = P_i(k) g e^{-j\frac{2\Pi}{N}D(3k+s)} + N(k), k \in [0 \ldots L-1]$$

where $P_i(k)$ is the known preamble sequence of length L and of number i, and has been affected by the channel, by the lack of synchronization and by the receiver noise.

For each of the i∈[0 . . . 113] possible preambles, we compute and store the differential preamble sequences. This is only computed once, as if to replace the preamble pattern given by the standard: $DP_i(k) = P_i(k+1) P_i(k) \epsilon \{-1,1\}$.

Note that each segment has m∈[0 . . . 37] associated preambles as in the following table:

| s | m | i |
|---|---|---|
| 0 | 0-37 | 0-31, 96, 99, 102, 105, 108, 111 |
| 1 | 0-37 | 32-63, 97, 100, 103, 106, 109, 112 |
| 2 | 0-37 | 64-95, 98, 101, 103, 106, 110, 113 |

We compute the differential received vector for our segment:

$$DR_s(k) = R_s(k+1) R_s(k) k \epsilon [0 \ldots L-2]$$

which gives:

$$DR_s(k) = P_i(k+1) P_i(k) g g e^{-j\frac{2\pi}{N}3D} + P_i(k+1) g e^{-j\frac{2\pi}{N}D[3(k+1)+s]} N(k) +$$

$$P_i(k) \geq j\frac{2\pi}{N}D(3k+s) N(k+1) + N(k+1)N(k)$$

The useful term is:

$$DR_s(k) = DP_i(k)(g)^2 e^{-j\frac{2\pi}{N}3D},$$

where the phase ramp caused by lack of synchronization is now reduced to a constant.

In order to find if a certain preamble has been detected, and also find its number if this is the case, we compute, for the respective segment, the complex sum over all the preamble space (M=38 is the number of preambles on one segment), which is the cross-correlation.

$$D_m(k) = \sum_{k=0}^{L-2} DR_s(k) DP_m(k), m \in [0 \ldots M-1]$$

We also evaluate the power which shall be used to normalise the cross-correlation:

$$P = \sum_{k=0}^{L-2} |DR_s(k)|^2$$

A predetermined threshold Th determines the false alarm and the non detection probability.

According to the predetermined threshold Th, a preamble is detected if:

$$C = \frac{(D_m(k))^2}{P} > Th, m \in [0 \ldots M-1],$$

where C is the differential cross-correlation contrast, and is a measure of how the tested symbol in likely to be a WiMax preamble of not.

This algorithm is repeated symbol after symbol, for the length of one frame (for instance 49 symbols) in order to be sure to have tested the entire interval in which a preamble might occur. Each time, the value of C is compared to the threshold and if the WiMAX preamble has been detected, the preamble index is saved. In the other case (C<Th), and no preamble is detected for any of the 49 tested symbols, the couple candidate [carrier frequency; bandwidth] is rejected from the candidate list.

After looping over Nb_f2 couples candidates [carrier frequency; bandwidth], the detected preamble indexes, and the related couple candidate [carrier frequency; bandwidth] are sorted in decreasing order of C and fed to the cell search module.

The originality of this algorithm consists of the fact that the differential approach eliminates the need to synchronize. Classical methods either perform preamble detection post synchronization, either perform joint preamble detection—synchronization by testing all frequency hypothesis in the interval of +/−half of subcarrier spacing, and this is costly. This is not the case of the proposed method.

The last step "Cell Search" is a slow, high complexity correlation performed in time domain, testing all candidates over all frequency/timing hypotheses, delivering high accuracy results. The last step "Cell Search" delivers synchronisation information in view of the reduced candidate list and the specific parameters given by the fast cell search (preamble and base station identifier).

The advantage of using prior filtering ("Fast Cell Search") is that the loop over which the cell search is performed is narrowed down to a short selection (the reduced candidate list produced by "Fast Cell Search"), so the overall scanning time is accelerated. Not to mention the fact that the "Fast Cell Search" step has also already fed the exact preamble number to which the mobile station should connect.

To sum up, this phase consists of high accuracy verification of the previous phases, and also performs synchronization over the detected candidate. Any classical joint synchronization and preamble detection as described in the State-of-the-Art section may be fitted here, with the difference that the preamble number is already fed by the previous phase.

In conclusion, introducing the "Fast Cell Search" module within the classical preamble detection-synchronization algorithm, reduces complexity to up to 114 times the couples (carrier frequency; bandwidth) candidates for the cell search block with the price of adding a low complexity cross correlator. This translates in a significant acceleration in time consumption, proportional to the number of candidates to test. The longer the list of candidates, the more you gain through this procedure.

Thus, the procedure, as presented, enables initial scanning of unknown of vast channel plans, which otherwise would be very time consuming.

The procedure also reduces power consumption of a dropped mobile station. Due to the incremental filtering of candidates, the procedure accelerates scanning by conserving the same precision of more complex, classical methods, so it is very efficient.

It is a procedure which ensures that the detected signal is indeed WiMax, without any prior hypotheses of time and frequency. Finally the procedure is very modular and can be easily integrated system-wise by sharing tasks between SW/DSP/HW.

Figure 4:
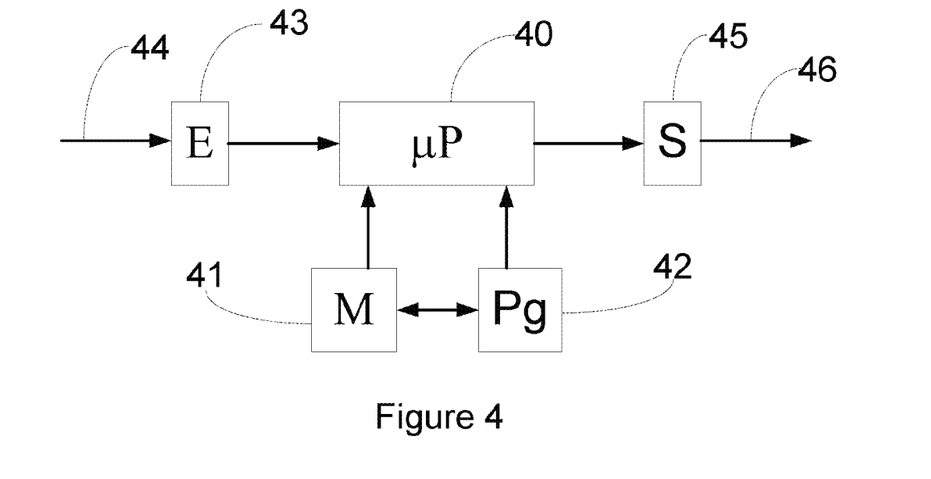

The structure of an apparatus for the execution of the presented method is illustrated schematically in FIG. 4. It comprises a memory M 41, and a processing unit 40 equipped with a microprocessor μP, that is driven by a computer program (or application) Pg 42. At input, the processing unit 40 receives signal 44 through a network input interface module E 43. The microprocessor μP processes signal 44 according to the instructions of the program Pg 42, to generate candidate's couples 46 which will be transmitted through an interface module S 45.

Although the present disclosure has been described with reference to one or more examples, workers skilled in the art will recognize that changes may be made in form and detail without departing from the scope of the disclosure and/or the appended claims.

The invention claimed is:

1. A cell search method in a multiple carrier wireless network, said method comprising:
   a step of obtaining and/or ordering an initial list of possible candidate couples, [carrier frequency; bandwidth], by an apparatus according to said multiple carrier wireless network;
   a step of reducing said initial list by the apparatus, delivering a reduced list of candidate couples, said reduced list comprising only the candidate couples of the initial list that are compatible with a predetermined communication mode of said multiple carrier wireless network, wherein said step of reducing said initial list comprises for at least some candidate couples of said initial list, an OFDMA processing step, in which a preamble is searched in view of a given number of symbols applied to a received signal at values of a current candidate couple, said search being made by calculating a differential cross correlation C, between a differential received vector, calculated from said received signal, and a differential preamble vector; and
   a step of searching, among the reduced list of candidate couples [carrier frequency; bandwidth], for at least one candidate couple associated with at least one cell of said multiple carrier wireless network and, if identified, selecting the at least one candidate couple associated with the at least one cell of said multiple carrier wireless network.

2. The cell search method according to claim 1, wherein each element of said reduced list comprises, in addition to carrier frequency and bandwidth, a base station identifier and/or a frame preamble number.

3. The cell search method according to claim 1, wherein said step of reducing said initial list comprises, for a current candidate couple of said initial list:
   an RF settings step of adjusting reception parameters of the received signal;
   at least one step of detecting, for said current candidate couple, a presence of a preamble, representative of said communication mode, among a plurality of assumed symbol extracted from a received signal; and
   a decision step wherein said current candidate couple is inserted in said reduced list when at least one presence of one preamble has been detected.

4. The cell search method according to claim 3, wherein said step of detecting a presence of a preamble comprise a step of calculating one differential cross correlation C per symbol k of said plurality of assumed symbol, said differential cross correlation C, being a correlation between a differential received vector and a differential preamble vector, and wherein said current candidate couple is inserted in said reduced list when at least one of said cross correlations C exceeds a predetermined threshold Th.

5. The cell search method according to claim 1, wherein said step of obtaining and/or ordering said initial list of possible candidate couples [carrier frequency; bandwidth] comprises a step of ordering said initial list according to a communication standard.

6. The cell search method according to claim 1, wherein said step of obtaining and/or ordering said initial list of possible candidate couples [carrier frequency; bandwidth] comprises an initial scan step in which said candidate couples are detected and ordered by means of power detection.

7. An apparatus for searching cell in a multiple carrier wireless network, said apparatus comprising:
   means for obtaining and/or ordering an initial list of possible candidate couples [carrier frequency; bandwidth] according to said multiple carrier wireless network;
   means for reducing said initial list, delivering a reduced list of candidate couples, said reduced list comprising only candidate couples of the initial list that are compatible with a predetermined communication mode of said multiple carrier wireless network, wherein reducing said initial list comprises for at least some candidate couples of said initial list, an OFDMA processing step, in which a preamble is searched in view of a given number of symbols applied to a received signal at the values of a current candidate couple, said search being made by calculating a differential cross correlation C, between a differential received vector, calculated from said received signal, and a differential preamble vector; and
   means for searching, among the reduced list of candidate couples [carrier frequency; bandwidth], for at least one candidate couple associated with at least one cell of said multiple carrier wireless network and, if identified, selecting the at least one candidate couple associated with the at least one cell of said multiple carrier wireless network.

8. A mobile station comprising the cell search apparatus according to claim 7.

9. A non-transitory computer-readable support comprising a computer program product stored thereon, said computer program product comprising program code instructions for performing a cell search method in a multiple wireless network, when executed by a processor, wherein the method comprises:
   a step of obtaining and/or ordering an initial list of possible candidate couples [carrier frequency; bandwidth] by the processor according to said multiple carrier wireless network, said initial list comprising candidate couples;
   a step of reducing said initial list by the processor, delivering a reduced list of candidate couples, said reduced list comprising only the candidate couples of the initial list that are compatible with a predetermined communication mode of said multiple carrier wireless network, wherein said step of reducing said initial list comprises for at least some candidate couples of said initial list, an OFDMA processing step, in which a preamble is searched in view of a given number of symbols applied to a received signal at the values of a current candidate couple, said search being made by calculating a differential cross correlation C, between a differential received vector, calculated from said received signal, and a differential preamble vector; and
   a step of searching, among the reduced list of candidate couples [carrier frequency; bandwidth], for at least one candidate couple associated with at least one cell of said multiple carrier wireless network and, if identified, selecting the at least one candidate couple associated with the at least one cell of said multiple carrier wireless network.

* * * * *